United States Patent
Suzuki et al.

(10) Patent No.: US 10,346,116 B2
(45) Date of Patent: Jul. 9, 2019

(54) SYNCHRONOUS AND ASYNCHRONOUS MODES FOR SHARED DISPLAY INFORMATION

(71) Applicant: KYOCERA Corporation, Kyoto-shi, Kyoto (JP)

(72) Inventors: Atsushi Suzuki, Nishinomiya (JP); Hiromasa Yamashita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 490 days.

(21) Appl. No.: 15/074,954

(22) Filed: Mar. 18, 2016

(65) Prior Publication Data
US 2016/0283182 A1    Sep. 29, 2016

(30) Foreign Application Priority Data
Mar. 27, 2015 (JP) .................. 2015-066532

(51) Int. Cl.
*G06F 3/0484* (2013.01)
*G06F 3/14* (2006.01)
(Continued)

(52) U.S. Cl.
CPC ........ *G06F 3/1423* (2013.01); *G06F 3/04847* (2013.01); *G06F 3/1454* (2013.01);
(Continued)

(58) Field of Classification Search
CPC ...... G06F 3/1454; G06F 9/452; G06F 3/1423; G06F 3/04847
See application file for complete search history.

(56) References Cited

U.S. PATENT DOCUMENTS 5,761,419 A    6/1998  Schwartz et al.
5,996,002 A *  11/1999 Katsurabayashi .... G06F 3/1454
                                                      709/204
(Continued)

FOREIGN PATENT DOCUMENTS

JP    H10-108154 A    4/1998
JP    2002-244987 A   8/2002
(Continued)

OTHER PUBLICATIONS

Partial European Search Report dated Jul. 8, 2016 issued by the European Patent Office for Counterpart European Application No. 16 16 1679.
(Continued)

*Primary Examiner* — Anil K Bhargava
(74) *Attorney, Agent, or Firm* — Procopio Cory Hargreaves and Savitch LLP

(57) ABSTRACT

A display device includes a communicator, a display, an input device, and at least one processor. The communicator communicates the external device. The display displays the first object. The input device receives an input for updating the first object. The at least one processor selects a first mode or a second mode. When the first mode is selected and the first object is shared with the external device, the at least one processor causes the display to update the first object according to the input and causes the communicator to send a first information reverent to updated first object to the external device. When the second mode is selected and the first object is shared with the external device, the at least one processor causes the display to update the first object according to the first input and causes the communicator not to send the first information.

7 Claims, 12 Drawing Sheets

(51) Int. Cl.
*G06F 9/451* (2018.01)
*G06F 9/44* (2018.01)

(52) U.S. Cl.
CPC ............ *G06F 9/4445* (2013.01); *G06F 9/452* (2018.02); *G09G 2340/10* (2013.01); *G09G 2340/12* (2013.01)

(56) References Cited

U.S. PATENT DOCUMENTS

| | | | |
|---|---|---|---|
| 6,342,906 B1* | 1/2002 | Kumar | G06F 3/038 709/201 |
| 8,806,024 B1* | 8/2014 | Toba Francis | G06F 17/30873 709/227 |
| 2006/0075058 A1* | 4/2006 | Fujiki | G06F 17/30575 709/213 |
| 2009/0157811 A1* | 6/2009 | Bailor | G06F 17/30168 709/204 |
| 2012/0231441 A1* | 9/2012 | Parthasarathy | G09B 7/02 434/362 |
| 2013/0288603 A1* | 10/2013 | Iwasaki | H04W 4/38 455/41.2 |
| 2014/0325435 A1* | 10/2014 | Jung | G06F 3/04845 715/790 |
| 2016/0226933 A1* | 8/2016 | Beaufils | H04L 67/06 |

FOREIGN PATENT DOCUMENTS

| | | |
|---|---|---|
| JP | 2010-039701 A | 2/2010 |
| JP | 2011-134122 A | 7/2011 |

OTHER PUBLICATIONS

Extended European Search Report dated Nov. 16, 2016 issued by the European Patent Office for Counterpart European Application No. 16 16 1679.2.

* cited by examiner

F I G. 1
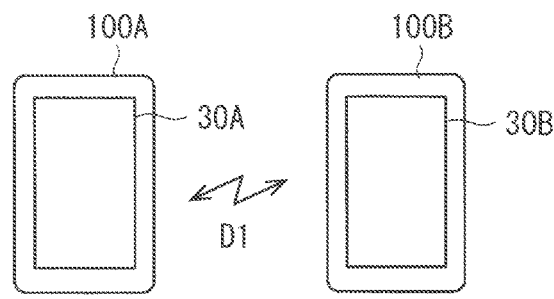
F I G. 2
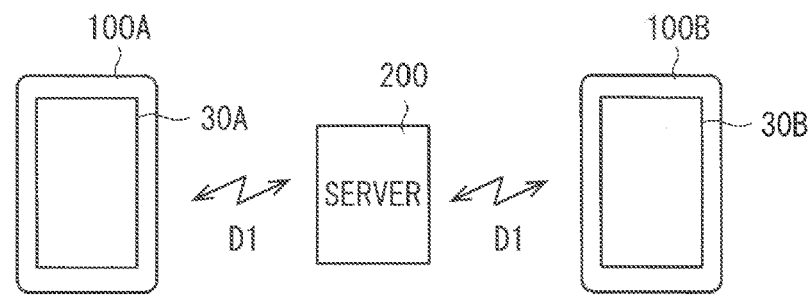
F I G. 3
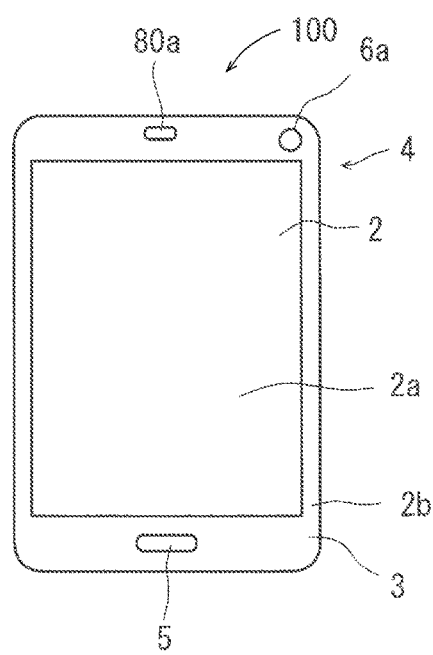

F I G. 13
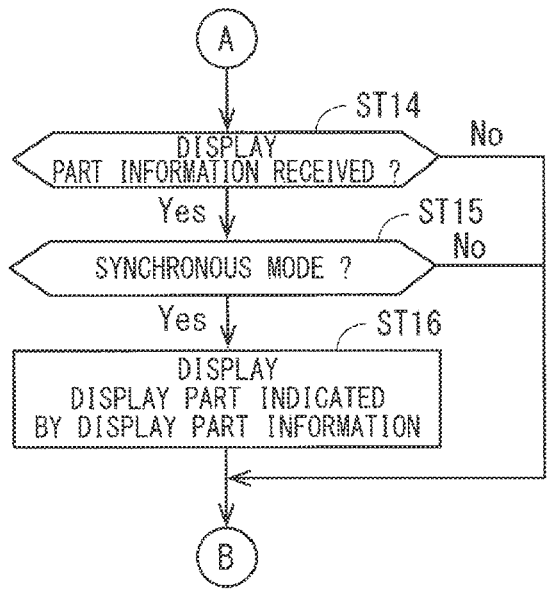
F I G. 14
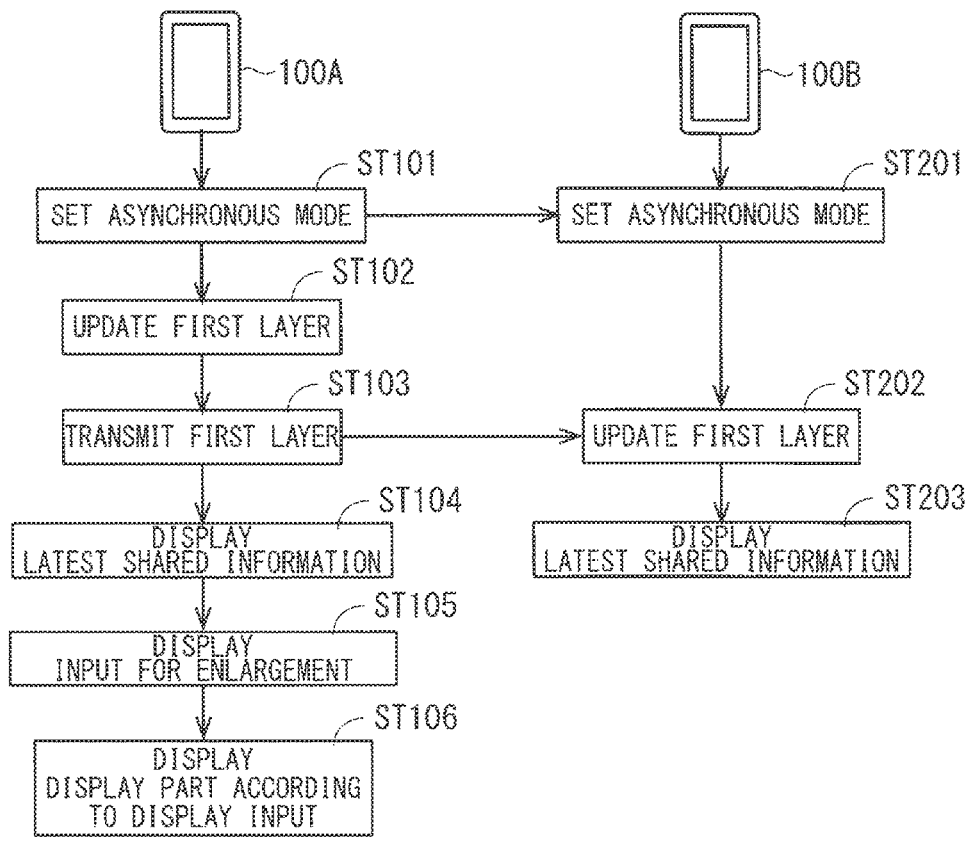

ASYNCHRONOUS MODE

| DEVICE RECEIVING DISPLAY INPUT FOR CHANGING DISPLAY PART | DEVICE 100A | DEVICE 100B |
|---|---|---|
| DEVICE 100A | REFLECT | DO NOT REFLECT |
| DEVICE 100B | REFLECT | REFLECT |

ASYNCHRONOUS MODE

| TARGET OF DISPLAY INPUT | DEVICE 100A | | DEVICE 100B |
|---|---|---|---|
| DEVICE 100A | REFLECT | | DO NOT REFLECT |
| DEVICE 100B | PREDETERMINED PERIOD OF TIME HAS ELAPSED AFTER INPUT TO DEVICE 100A | PREDETERMINED PERIOD OF TIME HAS NOT ELAPSED AFTER INPUT TO DEVICE 100A | REFLECT |
| | REFLECT | DO NOT REFLECT | |

F I G. 2 0
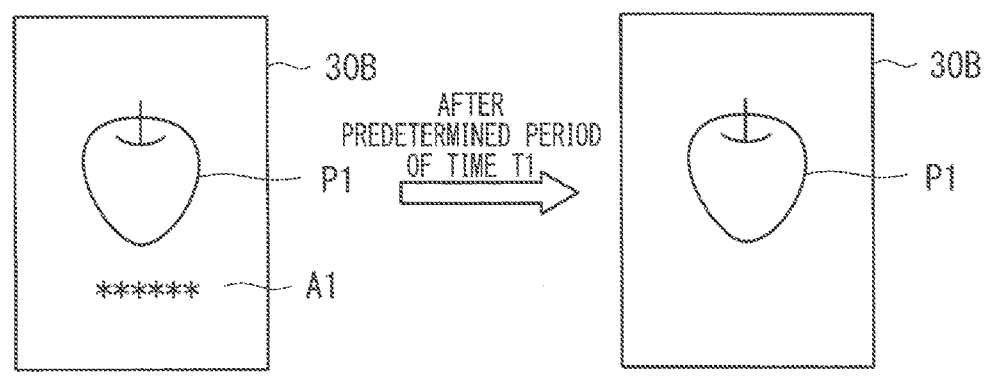
F I G. 2 1
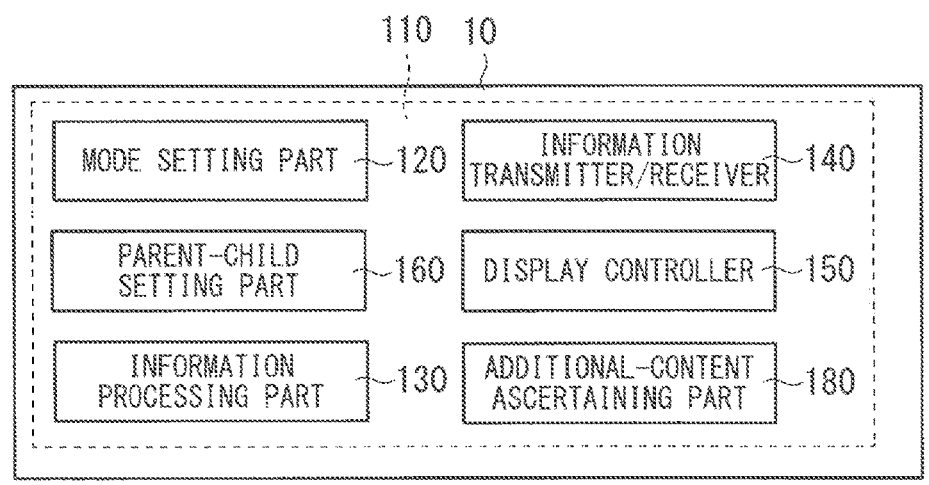

SYNCHRONOUS AND ASYNCHRONOUS MODES FOR SHARED DISPLAY INFORMATION

CROSS-REFERENCE TO RELATED APPLICATION

The preset application claims priority under 35 U.S.C. § 119 to Japanese Patent Application No. 2015-66532 filed on Mar. 27, 2015, entitled "DISPLAY DEVICE AND SHARED DISPLAY SYSTEM," the content of which is incorporated by reference herein in its entirety.

FIELD

Embodiments of the present disclosure relate generally to display devices and processors for display devices.

BACKGROUND

There are shared display systems that share and display certain information among a plurality of display devices. This information includes images, for example. In such systems, each display device displays the same display part of the information. By checking their display devices, respective users in different places are able to check the information.

SUMMARY

Display devices and processors for display devices are disclosed. In one embodiment, a display device is configured to share displaying a first object with an external device. The display device includes a communicator, a display, an input device and at least one processor. The communicator is configured to communicate the external device. The display is configured to display the first object. The input device is configured to receive an input for updating the first object. The at least one processor is configured to select a first mode or a second mode. The at least one processor is configured to, when the first mode is selected and the first object is shared with the external device, cause the display to update the first object according to the input and cause the communicator to send first information relevant to the updated first object to the external device. The at least one processor is configured to, when the second mode is selected and the first object is shared with the external device, cause the display to update the first object according to the first input and cause the communicator not to send the first information.

In one embodiment, a processor for a display device configured to share displaying an object with an external device. The display device includes a communicator, a display and an input device. The communicator is configured to communicate with the external device. The display is configured to display the object. The input device is configured to receive an input for updating the object. The processor is configured to select a first mode or an second mode. The processor is configured to, when the first mode is selected and the object is shared with the external device, cause the display to update the object according to the input and cause the communicator to send information relevant to the updated object to the external device. The processor is configured to, when the second mode is selected and the object is shared with the external device, cause the display to update the object according to the input and cause the communicator not to send the information.

In one embodiment, a display device is configured to share displaying an object with an external device. The display device includes a communicator, a display, an input device and at least one processor. The communicator is configured to communicate with the external device. The display is configured to display the object. The input device is configured to receive an input for updating the object. At least one processor is configured to select a first mode or a second mode. The at least one processor is configured to, when the first mode is selected and the object is shared with the external device, cause the display to update the object according to the input and cause the communicator to send first information relevant to the updated object to the external device. The at least one processor is configured to, when the second mode is selected and the object is shared with the external device, cause the display to update the object according to the input and cause the communicator to send the first information and second information for preventing the external device from updating the object according to the first information.

BRIEF DESCRIPTION OF THE DRAWINGS

FIG. 1 schematically illustrates an example of a shared display system.

FIG. 2 schematically illustrates an example of the shared display system.

FIG. 3 illustrates a front view showing an example of a broad view of a display device.

FIG. 13 illustrates a flowchart showing an example of operations performed by the display device.

FIG. 14 illustrates a flowchart showing an example of operations performed in the shared display system.

FIG. 20 schematically illustrates an example of the transition of display screens in a child display.

FIG. 21 schematically illustrates an example of the configuration of the controller.

DETAILED DESCRIPTION

First Embodiment

Overview of Overall Configuration

FIG. 1 schematically illustrates an example of a configuration of a shared display system. The shared display system includes display devices 100A and 100B. The display devices 100A and 100B communicate with each other and share information (hereinafter, referred to as "shared display information") D1. The display devices 100A and 100B respectively include displays 30A and 30B that display the shared display information D1. This allows users at locations distant from each other to check the same shared display information D1. The shared display information D1 includes, for example, at least one of text, numbers, symbols, graphics, pictures, and images.

The shared display information D1 is stored in each of the display devices 100A and 100B. The display devices 100A and 100B can respectively process the content of the shared display information D1 in accordance with input by users UA and UB. The display devices 100A and 100B can communicate the shared display information D1 to each other to reflect the processing performed by the other display device in its own shared display information D1. This communication allows the display devices to share the processed shared display information D1. The displays 30A and 30B can display the processed shared display information D1.

As described above, the users UA and UB are able to check the shared display information D1 while processing the shared display information D1 at locations distant from each other.

Note that the display devices 100A and 100B may communicate directly with each other as illustrated in FIG. 1. The direct communication may, for example, be near-field wireless communication. Alternatively, the communication may be sent via another device 200 as illustrated in FIG. 2. Examples of the device 200 include a base station, a relay device, a server, and an access point.

When the communication is sent via the device 200 as illustrated in FIG. 2, a configuration is possible in which original data of the shared display information D1 is stored in the device 200 and transmitted from the device 200 to the display devices 100A and 100B to allow the display devices 100A and 100B to share the shared display information D1.

To simplify the description, the mode illustrated in FIG. 1 is used below to describe the display devices 100A and 100B.

The display devices 100A and 100B may have the same configuration, for example. Unless otherwise specified, the following description refers to the case where the display devices 100A and 100B have the same configuration, but the display devices 100A and 100B may have different configurations. In the following description, when there is no particular need to distinguish between the display devices 100A and 100B, the display devices 100A and 100B are also referred to collectively as a "display device 100." The same applies to the displays 30A and 30B.

Display Device

External View

Figure 4:
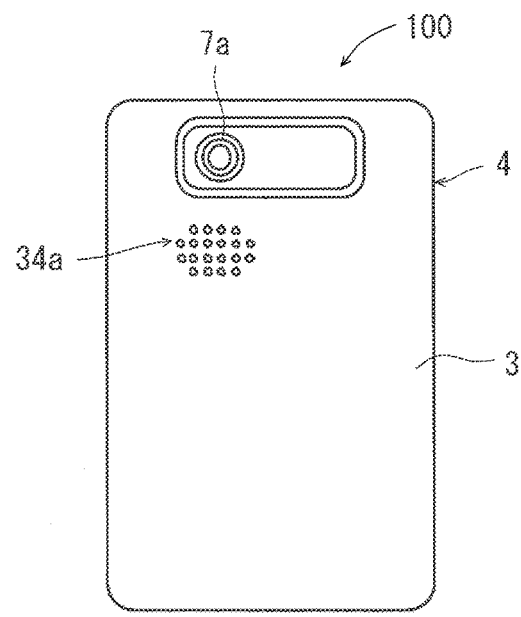
FIG. 4 illustrates a rear view showing an example of a broad view of the display device.

FIG. 3 illustrates an example of a broad view as seen from the front side of the display device 100. FIG. 4 illustrates a rear view showing an example of a broad view of the display device 100. The display device 100 can, for example, communicate with another display device 100 directly or via other devices such as a base station and a server. Examples of the display device 100 include a tablet, a personal digital assistant (PDA), a mobile telephone (including a smartphone), and a personal computer.

As illustrated in FIGS. 3 and 4, the display device 100 includes a cover panel 2 and a case part 3, and the combination of the cover panel 2 and the case part 3 forms a casing (hereinafter, also referred to as a "device case") 4. The casing 4 may have a generally rectangular plate like shape in a plan view.

The cover panel 2 may have a generally rectangular shape in a plan view and constitutes the front part of the display device 100, excluding the peripheral part. The cover panel 2 may be made of, for example, transparent glass or transparent acrylic resin. Alternatively, the cover panel 2 may be made of sapphire, for example. Sapphire as referred to herein indicates single crystal consisting primarily of alumina ($Al_2O_3$), and in the present specification, single crystals of $Al_2O_3$ with a purity of approximately 90% or higher. In terms of scratch proofness, the purity of $Al_2O_3$ is preferably 99% or higher. Other examples of the material for the cover panel 2 include diamond, zirconia, titania, quartz crystal, lithium tantalate, and aluminum oxynitride. In terms of scratch proofness, those materials are also preferably single crystals with a purity of approximately 90% or higher.

The cover panel 2 may also be a composite panel (laminated panel) having a multilayer structure including a layer made of sapphire. For example, the cover panel 2 may be a two-layered composite panel that includes a sapphire layer (sapphire panel) provided on the front face of the display device 100 and a glass layer (glass panel) attached to the sapphire layer. The cover panel 2 may also be a three-layered composite panel that includes a sapphire layer (sapphire panel) provided on the front face of the display device 100, a glass layer (glass panel) attached to the sapphire layer, and another sapphire layer (sapphire panel) attached to the glass layer. The cover panel 2 may also include a layer made of a crystalline material other than sapphire, such as diamond, zirconia, titania, quartz crystal, lithium tantalate, or aluminum oxynitride.

The case part 3 constitutes the peripheral part of the front part of the display device 100, and side and rear parts of the display device 100. The case part 3 may be made of, for example, polycarbonate resin.

The front face of the cover panel 2 includes a display region 2a in which various types of information such as text, symbols, graphics, or images are displayed. The display region 2a may, for example, have a rectangular shape in a plan view. A peripheral part 2b of the cover panel 2 that surrounds the display region 2a has, for example, a black color with a film or the like applied thereon and forms a non-display part where no information is displayed. A touch panel 50, which will be described later, is attached to the rear face of the cover panel 2, and the user is able to give various types of instructions to the display device 100 by operating the display region 2a of the front face of the display device 100 with, for example, his or her finger. Users may also use an indicator element other than his or her finger, such as an electrostatic touch panel pen including a stylus, to operate the display region 2a to give various types of instructions to the display device 100.

The device case 4 includes, for example, an operation key 5. The operation key 5 may, for example, be a hardware key and provided at, for example, the lower end of the front face of the cover panel 2.

The touch panel 50 and the operation key 5 are one example of an input device for providing input to the display device 100. Various types of input described later may be provided using the touch panel 50 or using the operation key 5. The following description will be given using the touch panel 50 as a typical example.

Electrical Configuration of Portable Electronic Apparatus

Figure 5:
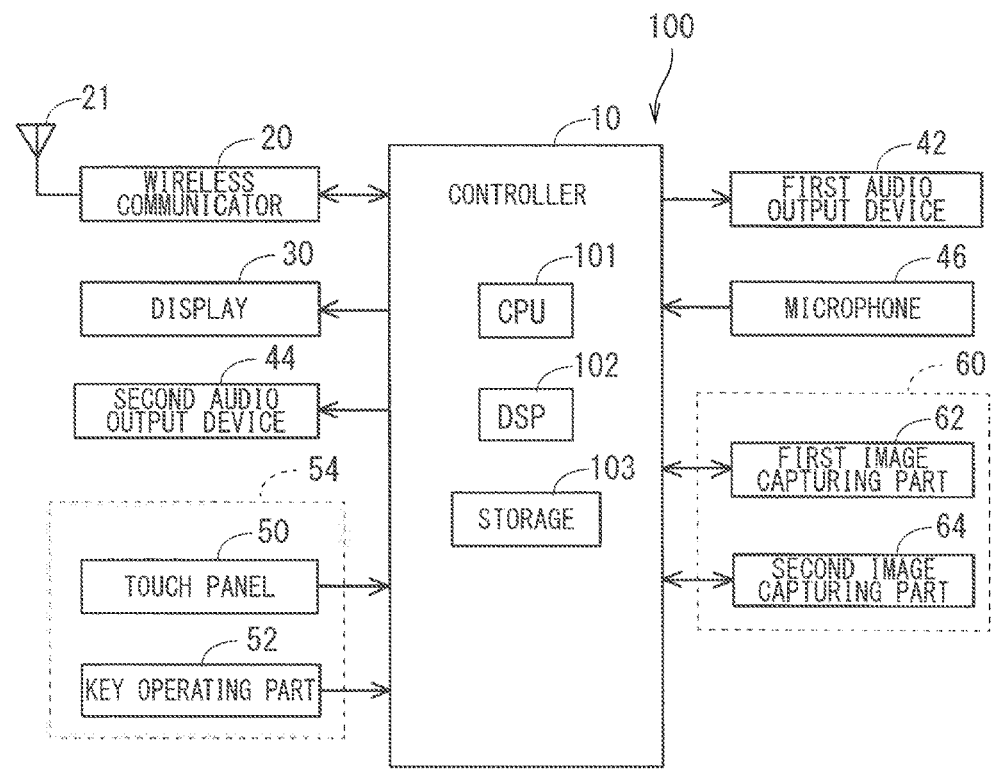
FIG. 5 schematically illustrates an example of an electrical configuration of the display device.

FIG. 5 illustrates a block diagram showing an electrical configuration of the display device 100. The display device 100 illustrated in FIG. 5 may, for example, be a mobile telephone and includes a controller 10, a wireless communicator 20, a display 30, a first audio output device (here, receiver) 42, a second audio output device (here, speaker) 44, a microphone 46, the touch panel 50, a key operating part 52, and an image capturing part 60. These constituent elements of the display device 100 are housed in the device case 4.

The controller 10 includes, for example, a central processing unit (CPU) 101, a digital signal processor (DSP) 102, and a storage 103 and can perform overall management of the operations of the display device 100 by controlling the other constituent elements of the display device 100. The storage 103 includes, for example, a read-only memory (ROM) and a random access memory (RAM). The storage 103 can store, for example, main programs that are control programs for controlling the operations of the display device 100, specifically, the constituent elements of the display device 100 including the wireless communicator 20 and the display 30, and multiple application programs (hereinafter, also simply referred to as "applications"). Various types of functions of the controller 10 are implemented by the CPU 101 and the DSP 102 executing various types of programs stored in the storage 103. While one CPU 101 and one DSP 102 are illustrated in FIG. 5, multiple CPUs and multiple DPSs may be provided. In this case, those CPUs and DPSs may cooperate with one another to implement various types of functions. While the storage 103 is illustrated inside the controller 10 in FIG. 5, the storage 103 may be located outside the controller 10. In other words, the storage 103 may be a separate constituent element from the controller 10. Alternatively, some or all of the functions of the controller 10 may be implemented by hardware.

The wireless communicator 20 includes an antenna 21. The wireless communicator 20 can receive signals that are transmitted from other display devices or communication devices such as web servers connected to the Internet, by the antenna 21 via a base station, for example. The wireless communicator 20 can perform processing such as amplification and down-conversion on the received signals and output the processed signals to the controller 10. The controller 10 can perform processing such as demodulation on the received input signals. The wireless communicator 20 can also perform processing such as up-conversion and amplification on transmission signals generated by the controller 10 and transmit the processed transmission signals wirelessly from the antenna 21. The transmission signals from the antenna 21 may be received via the base station or the like by other display devices or communication devices connected to the Internet.

The display 30 may, for example, be a liquid crystal display panel or an organic EL panel. The display 30 can display various types of information such as text, symbols, graphics, and images under the control of the controller 10. The information displayed on the display 30 is displayed in the display region 2a of the front face of the cover panel 2. Thus, the display 30 can be said to display information in the display region 2a.

The touch panel 50 can detect operations made to the display region 2a of the cover panel 2 by an indicator element such as a user's finger. The touch panel 50 may, for example, be a projection capacitive touch panel, and be attached to the rear side of the cover panel 2. When the user operates the display region 2a of the cover panel 2 with an indicator element such as a user's finger, a signal corresponding to the operation is input from the touch panel 50 to the controller 10. The controller 10 can identify the content of the operation made to the display region 2a on the basis of the signal received from the touch panel 50 and perform processing corresponding to that content. Note that the touch panel 50 may be a pressure sensitive touch panel.

The key operating part 52 can detect an operation of the user pressing the operation key 5. The key operating part 52 can detect whether or not the operation key 5 has been pressed. When the operation key 5 is not pressed, the key operating part 52 outputs to the controller 10 a non-operation signal that indicates that no operation has been made to the operation key 5. When the operation key 5 is pressed, the key operating part 52 outputs to the controller 10 an operation signal that indicates that the operation key 5 has been operated. This allows the controller 10 to determine whether or not each operation key 5 is operated.

The touch panel 50 and the operation key 5 can function as an input device for providing input to the display device 100. Note that input using the touch panel 50, which will be described below, may be allocated to the operation key 5.

The receiver 42 can output a received sound and is configured by, for example, a dynamic loudspeaker. The receiver 42 can convert electrical sound signals from the controller 10 into sound and output the sound. The sound output from the receiver 42 is output to the outside through a receiver hole 80a that is provided in the front face of the display device 100. The volume of the sound output through the receiver hole 80a is smaller than the volume of sound output from the speaker 44 through speaker holes 34a.

Instead of the receiver 42, a piezoelectric vibrator may be provided. The piezoelectric vibrator may be controlled by the controller 10 and vibrate on the basis of sound signals. The piezoelectric vibrator may, for example, be provided on the rear face of the cover panel 2 and cause the cover panel 2 to vibrate by vibrating based on the sound signals. Thus, the vibration of the cover panel 2 is transmitted as sound to the user's ear. In this case, the receiver hole 80a is unnecessary.

The speaker 44 may, for example, be a dynamic loudspeaker, and can convert electrical sound signals received from the controller 10 into sound and output the sound. The sound output from the speaker 44 is output to the outside through the speaker holes 34a provided in the rear face of the display device 100. The volume of the sound output through the speaker holes 34a is controlled to be audible at a distance from the display device 100. That is, the volume of the second audio output device (speaker 44) is greater than the volume of the first audio output device (speaker 44 or piezoelectric vibrator).

The microphone 46 can convert sound that is input from the outside of the display device 100 into electrical sound signals and output the sound signals to the controller 10. The sound from the outside of the display device 100 is captured through microphone holes provided on the front side of the cover panel 2 into the display device 100 and input to the microphone 46.

The image capturing part 60 includes, for example, a first image capturing part 62 and a second image capturing part 64. The first image capturing part 62 is configured by, for example, an image capturing lens 6a and an image sensor and can capture still images and moving images under the control of the controller 10. As illustrated in FIG. 3, the image capturing lens 6a is provided on the front face of the display device 100 and can capture images of objects on the front side (cover panel 2 side) of the display device 100.

The second image capturing part 64 is configured by, for example, an image capturing lens 7a and an image sensor and can capture still images and moving images under the control of the controller 10. As illustrated in FIG. 4, the image capturing lens 7a is provided on the rear face of the display device 100 and can capture images of objects on the rear side of the display device 100.

Controller

Figure 6:
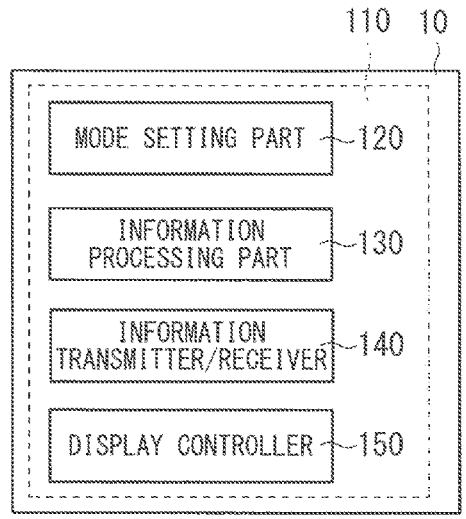
FIG. 6 schematically illustrates an example of a configuration of a controller.

FIG. 6 illustrates a functional block diagram schematically showing an example of an internal configuration of the controller 10. The controller 10 includes a shared display processor 110. The shared display processor 110 may, for example, be implemented by execution of programs stored in the storage 103, or part or all of the shared display processor 110 may be implemented by hardware. This point is the same as the other functional blocks described later, and therefore, redundant description will not be given below.

The shared display processor 110 includes a mode setting part 120, an information processing part 130, an information transmitter/receiver 140, and a display controller 150.

To distinguish between the display devices 100A and 100B in the following description, "A" and "B" are respectively added to the end of the reference numerals of the constituent elements of the display devices 100A and 100B. For example, the mode setting part 120A indicates the mode setting part 120 of the display device 100A.

The mode setting part 120 can selectively set a synchronous mode and an asynchronous mode according to input by the user. As will be described in detail later, the synchronous mode is a mode in which the displays 30A and 30B of the display devices 100A and 100B display the same display part of the shared display information D1.

The asynchronous mode is, as will be described in detail later, a mode in which the displays 30A and 30B of the display devices 100A and 100B display mutually independent display parts of the shared display information D1. Mutually independent display parts as referred to herein indicates that the display 30B displays the shared display information D1 without being affected by the display part of the display 30A, and the display 30A displays the shared display information D1 without being affected by the display part of the display 30B. For example, when the user of the display device 100A provides display input for displaying the shared display information D1 in an enlarged size, the display 30A displays the enlarged part of the shared display information D1, whereas the display content of the display 30B of the display device 100B is not changed by the above input. Thus, the displays 30A and 30B could display mutually different display parts as will be described in detail later. Mutually independent display parts implies that the display parts are not dependent on each other, and display parts that are not dependent on each other implies that the display parts are mutually independent.

Inputs by the user are provided, for example, using the touch panel 50. For example, the shared display processor 110 (more specifically, the display controller 150) displays a setting screen (not shown) for setting a mode on the display 30. The setting screen displays, for example, buttons for selecting the synchronous mode and the asynchronous mode. The user operates one of these buttons. This operation on the button is detected by the touch panel 50, and this information is input to the mode setting part 120. The mode setting part 120 sets the mode on the basis of the input information.

The information processing part 130 can process (update) the content of the shared display information D1 in accordance with input by the user. For example, the user provides processing input for performing processing, such as adding, changing, or deleting at least one of text, numbers, symbols, graphics, pictures, and images, on the shared display information D1 displayed on the display 30. The processing input may be provided, for example, using the touch panel 50. In other words, the touch panel 50 may receive the processing input. The information processing part 130 processes the content of the shared display information D1 in accordance with the processing input by the user.

Figure 7:
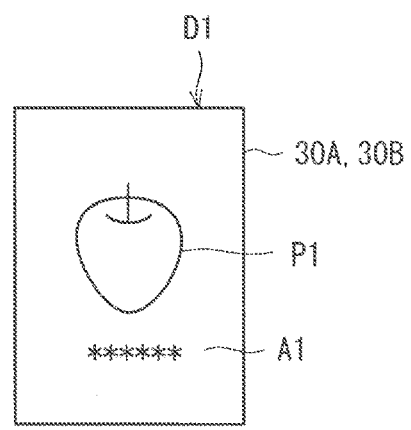
FIG. 7 schematically illustrates an example of a display screen of a display.

FIG. 7 schematically illustrates an example of a display screen that displays the shared display information D1. The shared display information D1 contains at least one object. In the illustration of FIG. 7, a picture P1 of an apple and advice A1 are displayed as the shared display information D1. The object contains a graphical image (ex. the picture P1) and text (ex. advice A1). For example, the advice A1 is advice as to what processing to perform on the picture P1 of the apple to make the picture better. Here, the picture P1 of the apple is a picture drawn by the user UB using the display device 100B, and the advice A1 consists of text entered by the user UA using the display device 100A.

Figure 8:
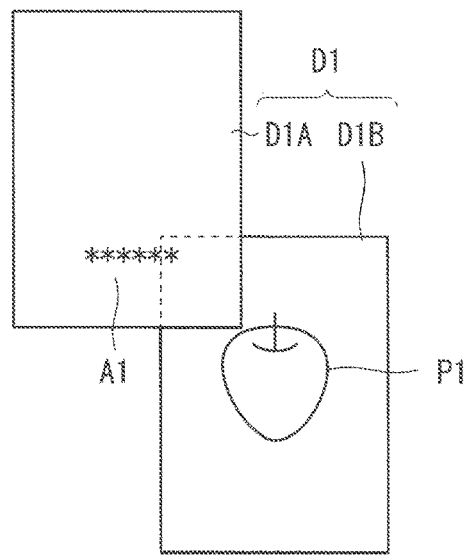
FIG. 8 schematically illustrates an example of the composition of shared display information.

The shared display information D1 may, for example, include a first layer D1A and a second layer D1B as illustrated in FIG. 8. The shared display information D1 is information that is obtained by superimposing the first layer D1A and the second layer D1B in a transparent manner. The first layer D1A is, for example, a layer that is updated exclusively by the user UA, and the second layer D1B is a layer that is updated exclusively by the user UB. In the illustration of FIG. 8, the advice A1 is displayed in the first layer D1A and the picture P1 is displayed in the second layer D1B.

Figure 9:
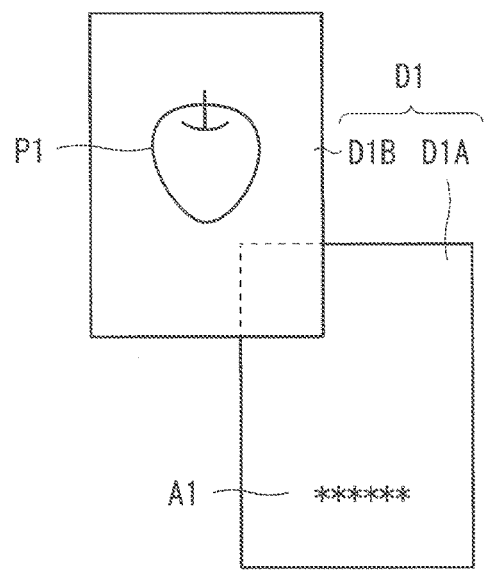
FIG. 9 schematically illustrates an example of the composition of shared display information.

In the display device 100A, the first layer D1A may be disposed in front of the second layer D1B as illustrated in FIG. 8. The information processing part 130A of the display device 100A reflects processing input from the user UA in the content of the first layer D1A disposed in front. In the display device 100B, on the other hand, the second layer D1B may be disposed in front of the first layer D1A as illustrated in FIG. 9. The information processing part 130B of the display device 100B reflects processing input by the user UB in the content of the second layer D1B disposed in front.

That is, the information processing part 130 reflects processing input by the user in the layer disposed in front. Thus, in the display device 100A, the first layer D1A is disposed in front to enable the user UA to update the first layer D1A. The same applies to the display device 100B.

The information transmitter/receiver 140A of the display device 100A can transmit the shared display information D1 via the wireless communicator 20A to the display device 100B. For example, the information transmitter/receiver 140A transmits the shared display information D1 at a predetermined time interval or every time the user UA has processed the shared display information D1. Note that the information transmitter/receiver 140A may transmit only information that indicates the content of the first layer D1A from out of the shared display information D1. The information transmitter/receiver 140A may transmit only information that indicates the difference in content between the previously transmitted first layer D1A and the current first layer D1A, or may transmit all the content of the current first layer D1A.

The information transmitter/receiver 140B of the display device 100B can receive the shared display information D1 (more specifically, information about the content of the first layer D1A) from the display device 100A. The information processing part 130B of the display device 100B confirms the content processed by the display device 100A and reflects the processed content in its own shared display information D1. For example, the information processing part 130B adopts the received first layer D1A as the first layer D1A of its own shared display information D1. When the information transmitter/receiver 140B has received the aforementioned information indicating the difference of the first layer D1A, the information processing part 130B can reflect this difference in the first layer D1A of its own shared display information D1.

The information transmitter/receiver 140B of the display device 100B can transmit the shared display information D1 via the wireless communicator 20B to the display device 100A. For example, the information transmitter/receiver 140B transmits the shared display information D1 at a predetermined time interval or every time the user UB has processed the shared display information D1. Note that the information transmitter/receiver 140B may transmit only information that indicates the content of the second layer D1B from out of the shared display information D1. The information transmitter/receiver 140B may transmit only information that indicates the difference in content between the previously transmitted second layer D1B and the current second layer D1B, or may transmit all the content of the current second layer D1B.

The information transmitter/receiver 140A of the display device 100A can receive the shared display information D1 from the display device 100B via the wireless communicator 20A. For example, the information transmitter/receiver 140A may receive only information that indicates the content of the second layer D1B. The information processing part 130A of the display device 100A confirms the content processed by the display device 100B and reflects the processed content in its own shared display information D1. For example, the information processing part 130A adopts the received second layer D1B as the second layer D1B of its own shared display information D1. When the information transmitter/receiver 140A has received the aforementioned information indicating the difference of the second layer D1B, the information processing part 130A reflects this difference in the second layer D1B of its own shared display information D1. Note that the transmission and reception of information from out of the shared display information D1 is also applicable to the transmission and reception of the shared display information D1 discussed later, and therefore, redundant description will not be given below.

As described above, the display devices 100A and 100B can share the same shared display information D1 by sending the shared display information D1 (corresponding to information relevant to the updated object) to each other. That is, processing on the content of the shared display information D1 in the display device 100A is reflected in the display device 100B, and similarly, processing on the content of the shared display information D1 in the display device 100B is reflected in the display device 100A.

The display controller 150 can control display on the display 30. The display controller 150 can receive the latest shared display information D1 from the information processing part 130 and display at least part of the shared display information D1 on the display 30.

The user is able to provide display input for changing (updating) the display part of the shared display information D1 that is displayed on the display 30. In other words, the input device (e.g., touch panel 50) receives this display input. For example, the user is able to provide input for enlarging display of the shared display information D1 through an operation (so-called "pinching out") of bringing two user's fingers close to the display 30 and moving those fingers apart. The user is also able to provide input for reducing display of the shared display information D1 through an operation (so-called "pinching in") of bringing two user's fingers close to the display 30 and moving those fingers together.

The display input for enlarging or reducing the display part is detected by the touch panel 50 and input to the display controller 150. The display controller 150 can display a display part according to the display input on the display 30. That is, the display controller 150 enlarges or reduces the shared display information D1 according to the display input and displays the enlarged or reduced information on the display 30.

The user is also able to provide display input for moving the display part of the shared display information D1. For example, the user is able to provide display input for moving the display part of the shared display information D1 through an operation (so-called "sliding") of bringing one user's finger close to the display 30 and moving the user's finger in parallel with the display 30.

This display input for moving the display part is also detected by the touch panel 50 and input to the display controller 150. The display controller 150 displays a display part on the display 30 according to the display input. That is, the display controller 150 moves the display part of the shared display information D1 according to the display input for moving the display part and displays the moved display part on the display 30.

Depending on, for example, the mode, the information transmitter/receiver 140 may transmit display part information (corresponding to information relevant to the updated object) that indicates a display part of the shared display information D1. As a more specific example, the information transmitter/receiver 140 can transmit the display part information in the synchronous mode. Thus, for example, when the user UA has provided display input for enlarging the display part in the synchronous mode, the display device 100A transmits display part information to the display device 100B. The display controller 150B of the display device 100B displays the display part that is indicated by the received display part information on the display 30B. Thus, the display input by the user UA is also reflected in the display device 100B.

Figure 10:
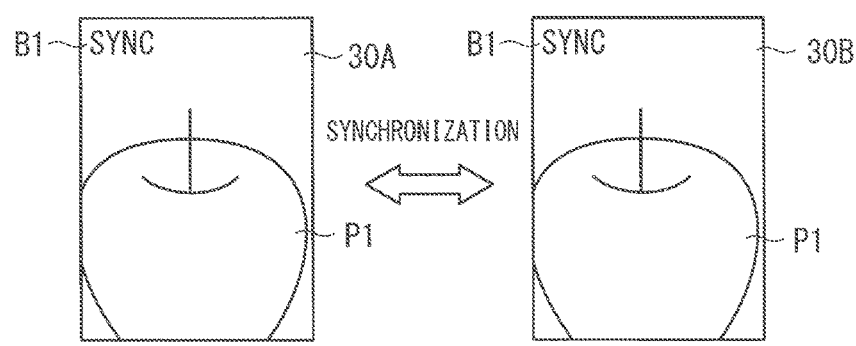
FIG. 10 schematically illustrates an example of a display screen of a display.

FIG. 10 schematically illustrates an example of display screens of the displays 30A and 30B in the synchronous mode. As illustrated in FIG. 10, the displays 30A and 30B display an enlarged display part (part of the picture P1).

In the asynchronous mode, the information transmitter/receiver 140 does not have to transmit the display part information. For example, even if the user UA provides display input for enlarging the display part in the asynchronous mode, the display device 100B displays the shared display information D1 on the display 30B, independently of the display input by the user UA. That is, the display input by the user UA is reflected in the display device 100A, but is not reflected in the display device 100B.

Figure 11:
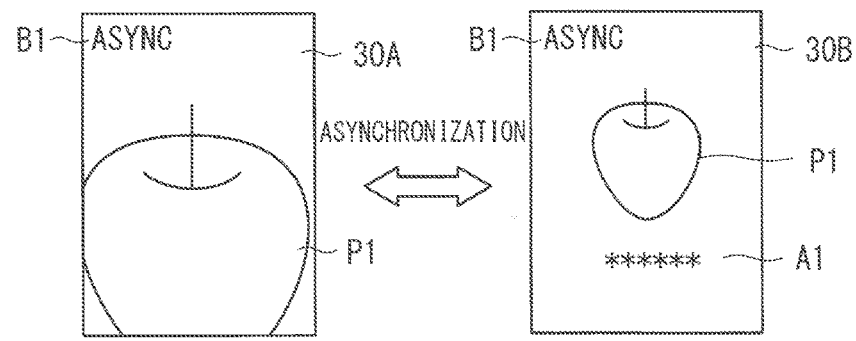
FIG. 11 schematically illustrates an example of a display screen of a display.

FIG. 11 schematically illustrates an example of display screens of the displays 30A and 30B in the asynchronous mode. In the illustration of FIG. 11, the display 30A displays an enlarged display part (part of the picture P1), whereas the display 30B displays the entire shared display information D1.

As described above, the display devices 100A and 100B can display the same display part of the shared display information D1 in the synchronous mode. This enables the user UA to check on the display 30A, for example, what display part is being used by the user UB in drawing the picture P1.

The display devices 100A and 100B displays mutually independent display parts of the shared display information D1 in the asynchronous mode. This enables the user UA to process the content of the shared display information D1 without being affected by changes made to the display part by the user UB. That is, processing can be performed with the display 30A displaying a display part of the shared display information D1 suitable for the processing. Similarly, the user UB is able to process the content of the shared display information D1 without being affected by changes made to the display part by the user UA. Thus, the users UA and UB are able to easily process the content of the shared display information D1.

Although, in the above-described example, the information transmitter/receiver 140 does not transmit display part information in the asynchronous mode, the display part information may be transmitted in the asynchronous mode. In this case, the display controller 150 does not perform display based on the received display part information. In short, in the asynchronous mode, the display controller 150A of the display device 100A may display a display part on the display 30A according to display input by the user UA, independently of display input by the user UB. In this case, the display part information corresponds to information for preventing the display device 100B from updating the object according to the display part information. Similarly, in the asynchronous mode, the display controller 150B of the display device 100B may display a display part on the display 30B according to display input by the user UB, independently of display input by the user UA.

Example of Specific Operations

Figure 12:
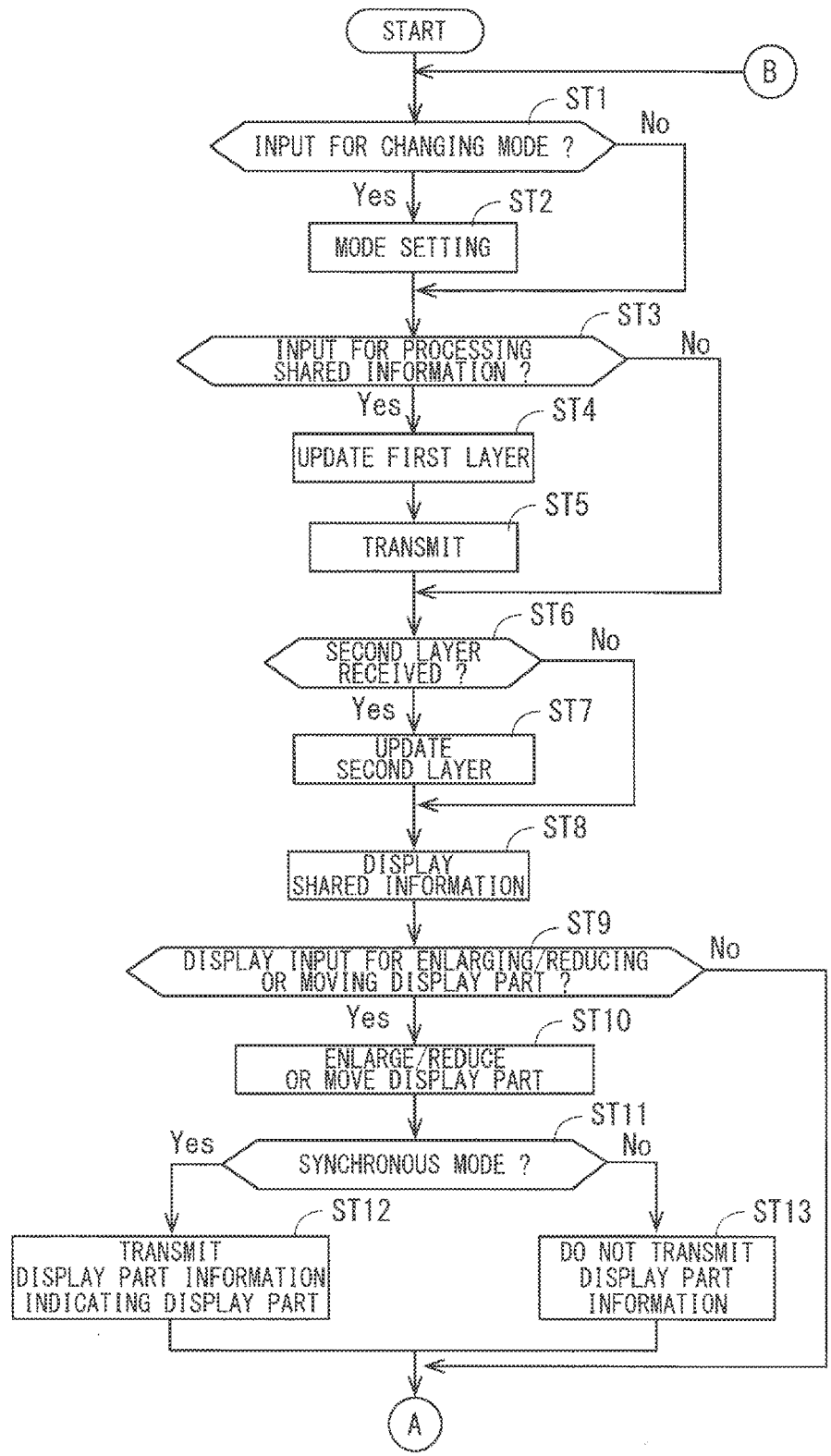
FIG. 12 illustrates a flowchart showing an example of operations performed by the display device.

FIGS. 12 and 13 illustrate a flowchart showing an example of operations performed by the display device 100A. First, in step ST1, the mode setting part 120A of the display device 100A determines whether or not the user UA has provided input for changing the mode. When it is determined that input for changing the mode has been received, the mode setting part 120A changes the mode in step ST2.

The information transmitter/receiver 140A of the display device 100A may transmit the set mode to the display device 100B. The mode setting part 120B of the display device 100B sets the received mode. Thus, the mode set by the display device 100A is also reflected in the display device 100B.

Alternatively, the mode may be set with the agreement of both of the users UA and UB. For example, the display controller 150B of the display device 100B that has received the mode may display a button for inputting whether or not to agree with the received mode, on the display 30B. When the user UB has provided input to agree with the received mode, the mode setting part 120B of the display device 100B adopts the received mode. In this case, the mode is set with the agreement of the users UA and UB in the display devices 100A and 100B.

On the other hand, when the user UB has provided input to not agree with the mode, the information transmitter/receiver 140B of the display device 100B may, for example, transmit this information to the display device 100A. In response to this, the mode setting part 120A of the display device 100A may nullify the mode change. Thus, when at least one of the users UA and UB does not agree with the mode change, the current mode is maintained.

Next, in step ST3, the information processing part 130A of the display device 100A determines whether or not the user UA has provided processing input for processing the content of the shared display information D1. When it is determined that processing input has been received, in step ST4, the information processing part 130A reflects the processing input in its own shared display information D1 (as a more specific example, first layer D1A) and updates the shared display information D1 (e.g., the first layer D1A).

In step ST5, the information transmitter/receiver 140A of the display device 100A transmits the shared display information D1 (as a more specific example, first layer D1A) to the display device 100B. The display device 100B adopts the received first layer D1A and updates its own shared display information D1. Thus, the processing performed by the display device 100A is also reflected in the display device 100B.

After step ST5 or when it is determined in step ST3 that processing input has not been provided, step ST6 is executed. In step ST6, the information transmitter/receiver 140A of the display device 100A determines whether or not the shared display information D1 (as a more specific example, second layer D1B) has been received from the display device 100B. When it is determined that the shared display information D1 has been received, in step ST7, the information processing part 130A reflects the content of the shared display information D1 changed by the display device 100B in its own shared display information D1. For example, the information processing part 130A adopts the received second layer D1B and updates the shared display information D1.

After step ST7 or when it is determined in step ST6 that the shared display information D1 (second layer D1B) has not been received, step ST8 is executed. In step ST8, the display controller 150A of the display device 100A displays the latest shared display information D1 on the display 30A.

Then, in step ST9, the display controller 150A determines whether or not display input for enlarging or reducing the display part has been received. When it is determined that display input has been received, in step ST10, the display controller 150A displays a display part of the shared display information D1 on the display 30A according to the display input.

In step ST11, the information transmitter/receiver 140A of the display device 100A determines whether or not the mode is the synchronous mode. When it is determined that the current mode is the synchronous mode, in step ST12, the information transmitter/receiver 140A transmits display part information that indicates a display part of the shared display information D1 to the display device 100B. When the current mode is not the synchronous mode, i.e., when the current mode is the asynchronous mode, the information transmitter/receiver 140A does not transmit the display part information in step ST13.

After steps ST12 and ST13 or when it is determined in step ST9 that the display input has not been provided, step ST14 is executed. In step ST14, the display controller 150A determines whether or not the information transmitter/receiver 140A has received display part information from the display device 100B. That is, the display controller 150A determines whether or not display input has been provided to the display device 100B. When it is determined that display part information has been received, in step ST15, the display controller 150A determine whether or not the current mode is the synchronous mode. When it is determined in step ST15 that the current mode is the synchronous mode, in step ST16, the display controller 150A displays the display part indicated by the received display part information on the display 30A.

After step ST16 or when it is determined in step ST14 that display part information has not been received or when it is determined in step ST15 that the current mode is not the synchronous mode, i.e., the current mode is the asynchronous mode, step ST1 is executed again.

Note that step ST15 is not necessarily required when the display device 100B does not transmit display part information to the display device 100A in the asynchronous mode. This is because display part information is received from the display device 100B in step ST14 in the case where the synchronous mode is set. In contrast, step ST15 is necessary when the display device 100B transmits display part information to the display device 100A even in the asynchronous mode.

FIG. 14 illustrates a flowchart showing an example of operations performed by the display devices 100A and 1006 that are associated with the operations described above. In illustration of FIG. 14, for example, the user UA operates the input device of the display device 100A and sets the asynchronous mode in step ST101. This information is transmitted to the display device 1006, and the display device 100B also sets the asynchronous mode in step ST201. That is, the example in FIG. 14 illustrates the operations performed in the asynchronous mode.

Next, in step ST102, the user UA provides processing input for processing the shared display information D1. The information processing part 130A of the display device 100A, for example, reflects the processing input in the first layer D1A and updates the shared display information D1. Then, in step ST103, the information transmitter/receiver 140A of the display device 100A transmits the first layer D1A to the display device 100B.

In step ST201, the information transmitter/receiver 140B of the display device 100B receives the first layer D1A from the display device 100A, and the information processing part 130B adopts the received first layer D1A and updates the shared display information D1.

Then, in steps ST104 and ST203, the display controllers 150A and 150B of the display devices 100A and 100B respectively display the latest shared display information D1 on the displays 30A and 30B.

Then, in step ST105, the user UA provides display input for displaying the shared display information D1 in an enlarged size. In step ST106, the display controller 150A of the display device 100A displays a display part on the display 30A according to the display input by the user UA.

Meanwhile, display part information that indicates this display part is not transmitted to the display device 100B. Thus, the display 30B of the display device 100B displays a display part independently of the display input by the user UA (see FIG. 11, for example).

In the above-described example, display input provided in one display device 100 is not reflected in the other display device 100 in the asynchronous mode. Examples of the display input include input for enlarging/reducing or moving the display part. However, a configuration is possible in which display input for enlarging or reducing the display part is not reflected in the other display device 100, whereas display input for moving the display part is reflected in the other display device 100. Conversely, a configuration is also possible in which display input for moving the display part is not reflected in the other display device 100, whereas display input for enlarging or reducing the display part is reflected in the other display device 100.

Display of Mode

The display controllers 150A and 150B may display the current mode. In illustration of FIGS. 10 and 11, a mode B1 is displayed. Although the mode is displayed using text (e.g., "Synchronous Mode" or "Asynchronous Mode") in the illustration of FIGS. 10 and 11, the mode may be displayed using, for example, symbols or graphics.

The following description mainly focuses on differences of other embodiments from the first embodiment.

Second Embodiment

Figures 15, 16:
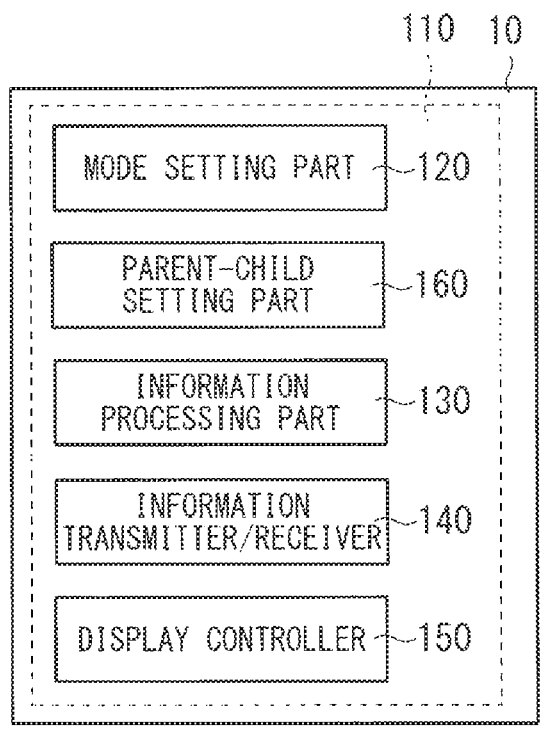
FIG. 15 schematically illustrates an example of the configuration of the controller.
FIG. 16 illustrates whether or not display input to change a display part is reflected in each display device.

FIG. 15 illustrates a functional block diagram schematically showing a configuration of the controller 10. The controller 10 further includes a parent-child setting part 160. The parent-child setting part 160 sets one of the display devices 100A and 100B as a "parent" and the other as a "child."

The following description assumes a case in which the display device 100A is set as a "parent" and the display device 100B is set as a "child."

In the first embodiment, the display devices 100A and 100B display mutually independent display parts in the asynchronous mode. In the asynchronous mode of the second embodiment, the "child" display device 100B displays a display part that is independent of the display part of the "parent" display device 100A, whereas the "parent" display device 100B displays the same display part as the display part of the "child" display device 100A. That is, changes made to the display part of the "parent" device are not reflected in the "child" device, but changes made to the display part of the "child" device are reflected in the "parent" device.

FIG. 16 illustrates whether or not display input for enlarging/reducing or moving the display part in the asynchronous mode is reflected in the display devices 100A and 100B. As illustrated in FIG. 16, when the user UA provides display input to the "parent" display device 100A, the display input is reflected in the display device 100A, but is not reflected in the "child" display device 100B (FIG. 11). That is, even if the user UA causes the "parent" display device 100A to display the shared display information D1 in, for example, an enlarged size, the shared display information D1 of the "child" display device 100B is not enlarged.

On the other hand, when the user UB provides display input to the "child" display device 100B, the display input is reflected in both of the display devices 100A and 100B.

That is, when the user UB causes the "child" display device 100B to display the shared display information D1 in, for example, an enlarged size, the shared display information D1 of the "parent" display device 100A is also displayed in the enlarged size (FIG. 10).

Specific Operations

Figure 17:
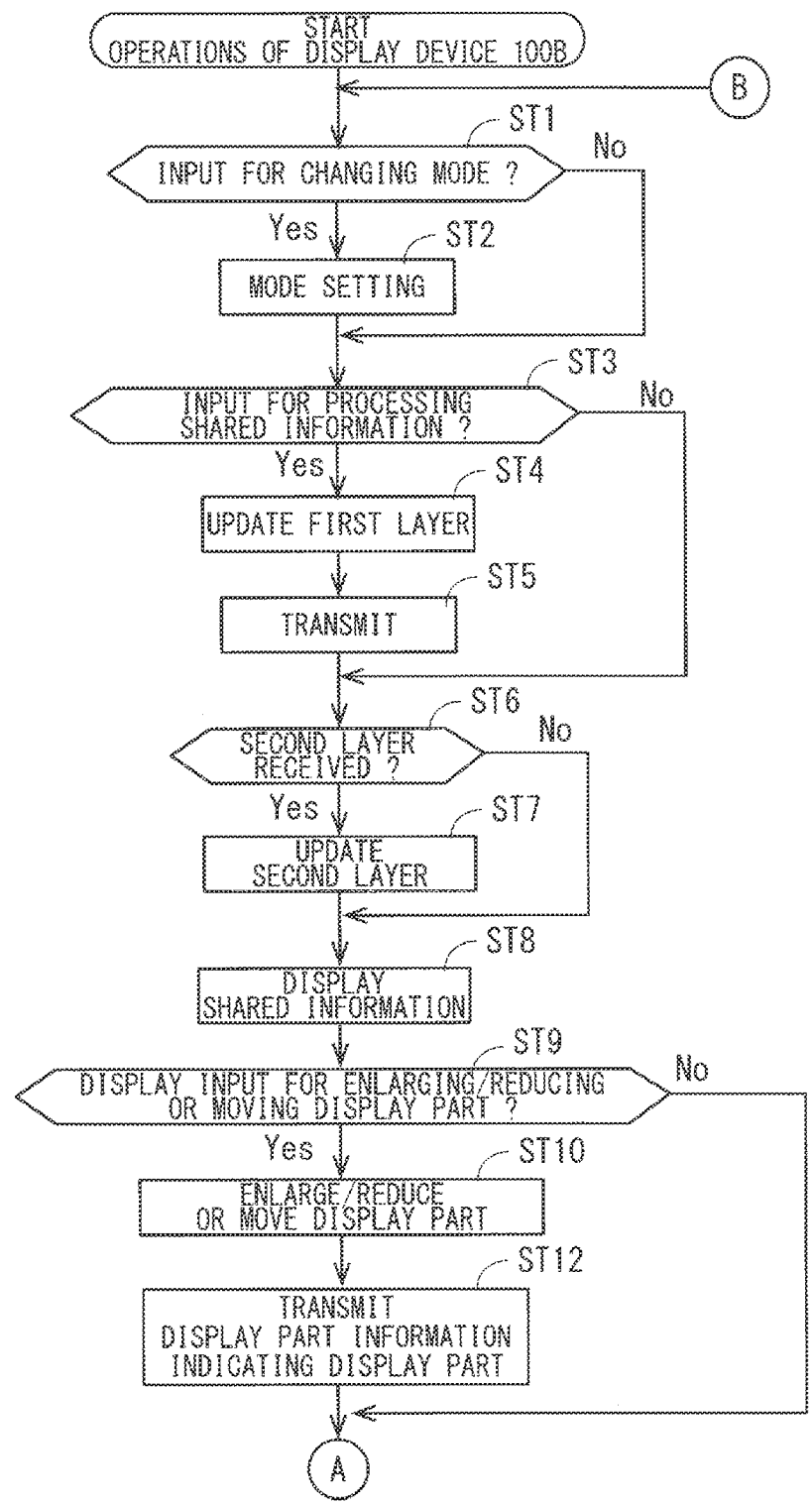
FIG. 17 illustrates a flowchart showing an example of operations performed by a display device.

FIG. 17 illustrates a flowchart showing an example of operations performed by the "child" display device 100B. The illustration of FIG. 17 is different from the illustration of FIG. 12 in that step ST12 is executed after step ST10 without executing steps ST11 and ST13. That is, when display input is provided, the "child" information transmitter/receiver 140B transmits display part information to the display device 100A, irrespective of the mode.

In the "parent" display device 100A, on the other hand, when the display part information is received from the display device 100B, the display 30A displays the display part indicated by the received display part information as described in the first embodiment (steps ST14 and ST15). Thus, even in the asynchronous mode, display input by the user UB of the "child" device can be reflected in the "parent" display device 100A.

As described above, changes made to the display part by the user UA are not reflected in the display device 100B in the asynchronous mode. Such changes do not interfere with the processing of the shared display information D1 by the user UB, thus for example enabling the user UB to easily draw the picture P1.

Moreover, changes made to the display part by the user UB are reflected in the display device 100A in the asynchronous mode. This enables the user UA to check, on the display 30A, what display part is being displayed on the display 30B by the user UB and how the user UB is processing this display part of the shared display information D1. Thus, the user UA is able to easily come up with advice on the processing by the user UB.

Reflection Timing of Display Input

If changes made to the display part by the user UB are reflected in the display device 100A while the user UA is processing the shared display information D1 in the asynchronous mode, it is difficult for the user UA to perform the processing. Thus, in such a situation, the reflection of changes made to the display part in the display device 100A may be suspended for a predetermined period of time.

Figures 18, 19:
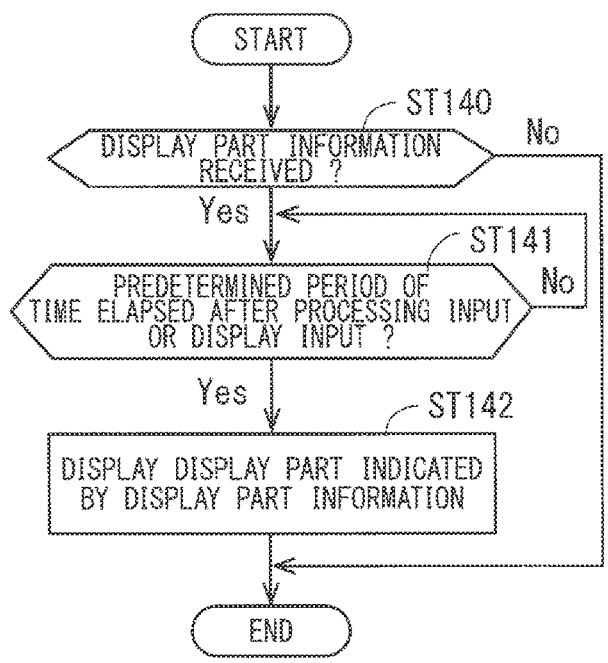
FIG. 18 illustrates whether or not display input to change a display part is reflected in each display device.
FIG. 19 illustrates a flowchart showing an example of operations performed by a display controller.

FIG. 18 illustrates whether or not display input for enlarging/reducing or moving the display part in the asynchronous mode is to be reflected in the display devices 100A and 100B. Operations other than the operation of reflecting changes in the display device 100A are the same as the operations illustrated in FIG. 16. As illustrated in the lower section in FIG. 18, when the user UB provides display input to the display device 100B, whether or not to reflect the display input in the display device 100A is determined on the basis of processing input or display input by the user UA.

More specifically, display input by the user UB is not reflected in the display device 100A during a predetermined period of time after the user UA has provided processing input or display input. As an example of a more specific operation, when the information transmitter/receiver 140A has received display part information from the display device 100B within this predetermined period of time, for example, the display controller 150A does not use this display part information during this predetermined period of time.

This enables the user UA to process the shared display information D1 on the display 30A that displays a display part suitable for the processing by the user UA. On the other hand, when the processing by the user UA has ended, the user UA immediately wants to check the display part of the display device 100B in order to check what display part is being displayed by the user UB in processing the shared display information D1.

Therefore, after the predetermined period of time, changes made to the display part by the user UB are reflected in the display device 100A. More specifically, the display controller 150A displays the display part indicated by the received display part information after the predetermined period of time. Thus, after the user UA has ended the processing, the display input by the user UB is also reflected in the display device 100A. This predetermined period of time may be set in advance, for example.

When the user UB provides display input after the predetermined period of time, i.e., after the end of input by the user UA, the display input by the user UB is also reflected in the display device 100A. That is, the display controller 150A displays the display part indicated by the display part information received from the display device 100B, on the display 30A.

As described above, display input by the user UB is not reflected for a predetermined period of time after the user UA has provided processing input or display input. It is thus easy for the user UA to process the shared display information D1. Moreover, the display input by the user UB is reflected after the predetermined period of time, thus enabling the user UA to again check what display part is being displayed by the user UB in processing the shared display information D1.

Example of Specific Operations

FIG. 19 illustrates a flowchart schematically showing an example of operations performed by the display device 100A. FIG. 19 illustrates the operations performed by the display device 100A when receiving display part information in the asynchronous mode. In step ST140, the information transmitter/receiver 140A of the display device 100A determines whether or not display part information has been received. When it is determined that display part information has been received, in step ST141, the display controller 150A determines whether or not a predetermined period of time has elapsed since the user UA has provided the last processing input or display input The predetermined period of time may be measured with, for example, a timer circuit.

When it is determined in step ST141 that the predetermined period of time has elapsed, in step ST142, the display controller 150A displays the display part indicated by the display part information received from the display device 100B, on the display 30A. Thus, the display input by the user UB is reflected after the user UA has ended processing input or display input.

When it is determined in step ST141 that the predetermined period of time has not elapsed, step ST141 is again executed without executing step ST142. Thus, the display input by the user UB is not reflected in the display device 100A while the user UA is providing processing input or display input or during a predetermined period of time after the input by the user UA.

Note that, even when it is determined in step ST141 that the predetermined period of time has not elapsed and step ST141 is repeatedly executed, processing input or display input may be provided to the display device 100A and operation according to the input may be performed. For example, when processing input has been received, the information processing part 130A processes the shared display information D1, and the information transmitter/receiver 140A transmits the shared display information D1 to the display device 100B. When the user UA has provided display input, for example, the display controller 150A displays a display part on the display 30A according to the display input.

Display of Mode

The display controllers 150A and 150B may display the current mode as in the first embodiment. In the second embodiment, the "parent" display 30A displays the same display part as the display part of the "child" display 30B, irrespective of whether the current mode is the synchronous mode or the asynchronous mode. Thus, the display controller 150A need not display the mode.

Third Embodiment

In a third embodiment, "parent" and "child" are set as in the second embodiment. The third embodiment is, however, not premised on the second embodiment and may be implemented independently of the second embodiment. The third embodiment is different from the first embodiment in operations that are performed in the asynchronous mode. In the asynchronous mode of the third embodiment, the additional content added to the shared display information D1 in a "parent" display device 100 is reflected for only a predetermined period of time T1 in a "child" display device 100, and the additional content is deleted after the predetermined period of time T1 has elapsed. An overview of this will be described below.

For example, a case is assumed in which the display device 100A is set as a "parent" and the display device 100B is set as a "child." For example, the user UA operates the input device (touch panel 50) of the display device 100A to write the advice A1 as additional content into the shared display information D1. The display device 100A processes the shared display information D1 through the aforementioned operations. As a result, the advice A1 is displayed on the display 30A. This shared display information D1 (more specifically, first layer D1A) is also transmitted to the display device 100B, and the advice A1 is also displayed on the display 30B of the display device 100B. This enables the user UB to check the advice A1 entered by the user UA on the display 30B.

When the predetermined period of time T1 has elapsed after the display of the additional content (e.g., advice A1), the display controller 150B of the display device 100B deletes the advice A1 and displays the shared display information D1 on the display 30B, as illustrated in FIG. 20. In other words, the additional content added to the shared display information D1 by the user UA is nullified after the predetermined period of time T1.

Thus, after the elapse of the predetermined period of time T1, the shared display information D1 includes only the second layer D1B that includes the picture P1 drawn by the user UB. This eliminates the need for the user UB to separately delete the additional content input by the user UA when the user UB finishes the picture, thus improving convenience of the user UB.

Controller

FIG. 21 illustrates a functional block diagram schematically showing an example of the configuration of the controller 10. The controller 10 further includes an additional-content ascertaining part 180. The additional-content ascertaining part 180 ascertains additional content on the basis of a series of processing input. That is, the additional-content ascertaining part 180 ascertains the beginning and end of processing input that indicates additional content from the series of processing input.

Operation of Ascertaining Additional Content

Figure 22:
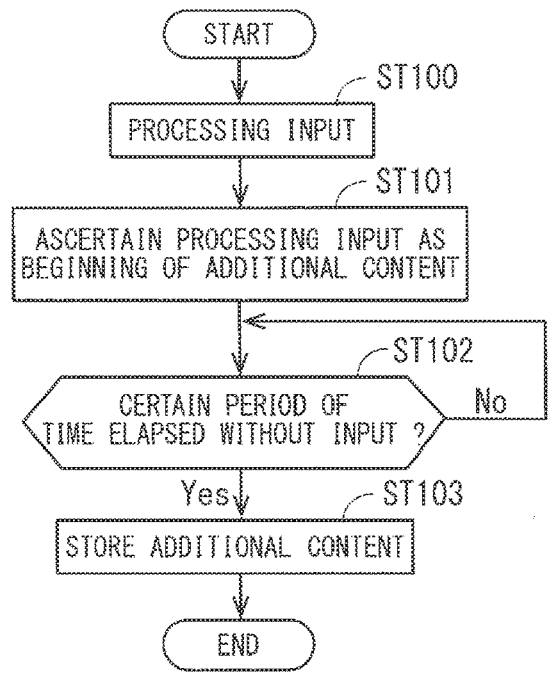
FIG. 22 illustrates a flowchart showing an example of operations performed by an additional-content ascertaining part.

FIG. 22 schematically illustrates an example of operations performed by the additional-content ascertaining part 180. First, in step ST100, the user UA provides processing input. For example, the user UA draws letters in a graphic data format (e.g., dot data) on the shared display information D1.

Next, in step ST101, the additional-content ascertaining part 180 ascertains the processing input provided in step ST100 as the beginning of a single additional content (hereinafter, also referred to as a "block"). The additional-content ascertaining part 180 then determines in step ST102 whether or not a predetermined period of time T2 has elapsed without reception of processing input. The predetermined period of time T2 may, for example, be shorter than the predetermined period of time T1. When it is determined that the predetermined period of time T2 has not elapsed, i.e., when processing input is provided within the predetermined period of time T2, step ST102 is executed again. When it is determined that the predetermined period of time T2 has elapsed, the additional-content ascertaining part 180 stores a content indicated by the processing input provided in step ST100 from beginning to end, as a block. That is, when no processing input has been received over the predetermined period of time T2, the additional-content ascertaining part 180 determines that the input of additional content has ended, and ascertains the content indicated by the processing input provided thus far as being a single additional content.

Through the operations described above, the advice A1 in FIG. 20, for example, is ascertained as being a single additional content (block). The additional content may, for example, be stored as an image, or may be stored as text data or graphic data. Along with this, information such as the location of the additional content relative to the display content of the shared display information D1 may be stored.

Additional content information that indicates the additional content may be transmitted along with the shared display information D1 from the "parent" display device 100A to the "child" display device 100B. The "child" display device 100B may also include an additional-content ascertaining part 180 and generate additional content information on the basis of the first layer D1A received from the display device 100A.

Example of Specific Operations of Displaying and Deleting Additional Content

Figure 23:
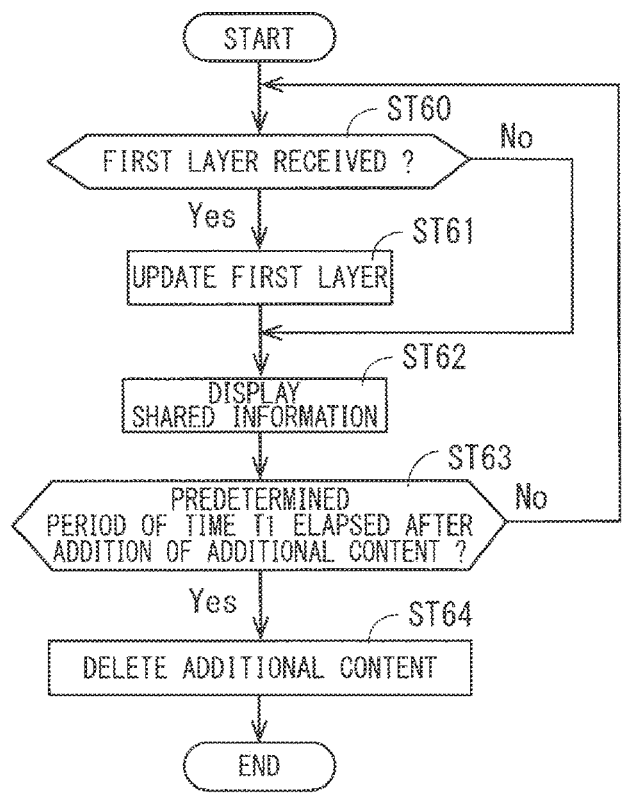
FIG. 23 illustrates a flowchart showing an example of operations performed by an information processing part and a display controller.

FIG. 23 schematically illustrates an example of operations performed by the "child" display device 100B. FIG. 23 illustrates operations performed by the "child" display device 100B when the user UA has operated the display device 100A in the asynchronous mode and added additional content to the shared display information D1. The operations illustrated in FIG. 23 are, for example, repeatedly executed.

First, in step ST60, the information transmitter/receiver 140B of the display device 100B determines whether or not the shared display information D1 (e.g., first layer D1A) has been received from the display device 100A. When it is determined that the shared display information D1 has been received, in step ST61, the information processing part 130B of the display device 100B adopts the information (first layer D1A) processed by the display device 100A from the received shared display information D1 and updates its own shared display information D1.

After step ST61 or when it is determined in step ST60 that the shared display information D1 has not been received, step ST62 is executed. In step ST62, the display controller 150B of the display device 100B displays the latest shared display information D1 on the display 30B. Thus, the additional content added by the user UA is also displayed on the display 30B.

In the next step ST63, it is determined whether or not the predetermined period of time T1 has elapsed after the additional content was added to the first layer D1A.

As described above, the additional content information indicating the additional content may be transmitted along with the shared display information D1 from the display device 100A, or may be generated by the display device 100B. The timing at which step ST103 is executed may be taken as the timing at which the additional content was added. In this case, the time elapsed after the above timing is measured in step ST63. Alternatively, when the additional content information is transmitted from the display device 100A, the timing at which the additional content information is received may be taken as the timing at which the additional content was added.

When it is determined in step ST63 that the predetermined period of time T1 has not been elapsed, step ST60 is executed again. When it is determined that the predetermined period of time T1 has elapsed, in step ST64, the information processing part 130B of the display device 100B deletes the additional content from the shared display information D1. For example, the additional content is deleted from the first layer D1A. As a result, the display controller 150 displays the shared display information D1 from which the additional content has been deleted, on the display 30B.

Predetermined Period of Time T1

Figure 24:
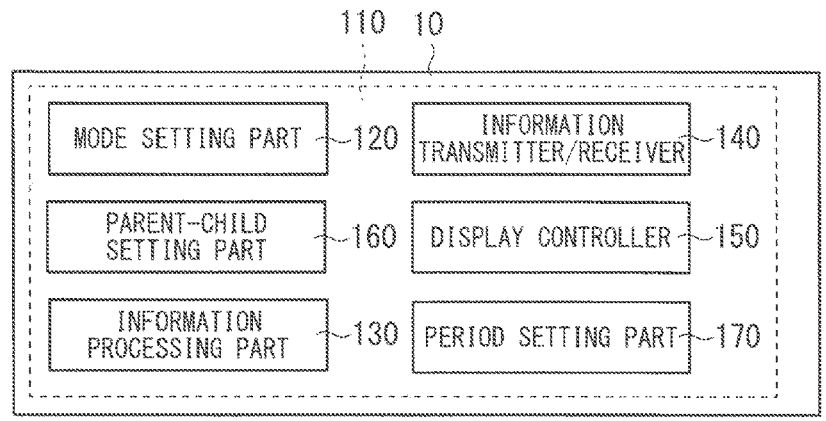
FIG. 24 schematically illustrates an example of the configuration of the controller.

The predetermined period of time T1 may be set in advance, for example, or may be changed dynamically as will be described next. FIG. 24 illustrates a functional block diagram schematically showing an example of the controller 10. In the illustration of FIG. 24, the controller 10 further includes a period setting part 170. The period setting part 170 increases the predetermined period of time T1 according to input by the user. This input may also be provided using the touch panel 50. In other words, the touch panel 50 receives input for increasing the predetermined period of time T1. For example, the display controller 150 displays a button (not shown) for increasing the predetermined period of time T1 on the display 30. When the user operates that button, this information is detected by the touch panel 50 and input to the period setting part 170. The period setting part 170 increases the predetermined period of time T1 every time the button is operated. The amount of increase per operation may be set in advance, for example.

The user UB may operate this button on the display 30B, for example, when he or she does not yet want to delete the additional content added by the user UA. In this case, the timing of deletion of the additional content can be delayed. Thus, the user UB is able to check, for example, the advice A1 for a longer time.

Example of Specific Operations

Figure 25:
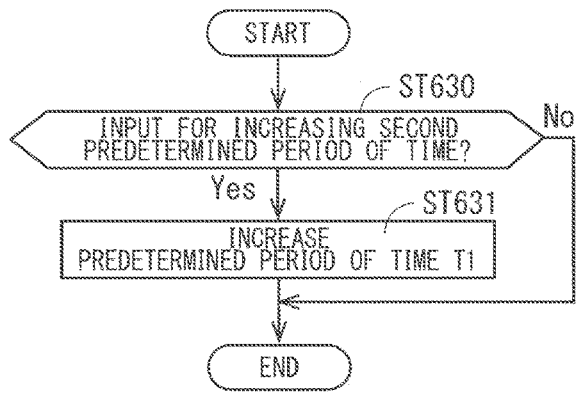
FIG. 25 illustrates a flowchart showing an example of operations performed by a period setting part.

FIG. 25 illustrates a flowchart showing an example of operations performed by the period setting part 170. The operations illustrated in FIG. 25 are repeatedly executed. Here, the operations of the "child" period setting part 170B are illustrated.

In step ST630, the period setting part 170B determines whether or not input for increasing the predetermined period of time T1 has been received. When it is determined that this input has not been provided, the procedure ends. When it is determined that this input has been received, in step ST631, the period setting part 170B increases the predetermined period of time T1. The predetermined period of time T1 may be increased by, for example, adding a predetermined amount of increase. This allows the shared display information D1 to include the additional content for a longer time. Thus, the display 30B can display the additional content for a longer time.

Note that the user UA may increase the predetermined period of time T1 for the display 30B. For example, when the user UA provides input for increasing the predetermined period of time T1 to the display device 100A, the information transmitter/receiver 140A transmits an instruction to increase the period to the display device 100B. The period setting part 170B of the display device 100B that has received the instruction to increase the period increases the predetermined period of time T1.

Display of Parent

In the "parent" display device 100A as well, the additional content added by the user UA may be deleted after elapse of the predetermined period of time T1. In this case, the display devices 100A and 100B include the same shared display information D1.

Alternatively, in the "parent" display device 100A, the additional content does not necessarily have to be deleted with the elapse of the predetermined period of time T1 as a trigger. That is, the additional content added by the user UA may be kept in the display device 100A. In this case, the user UA is able to easily check the additional content that he or she has entered.

In this case, the shared display information D1 of the display device 100A and the shared display information D1 of the display device 100B could be different from each other. Thus, the shared display information D1 in this case may lose the original meaning of the term "shared," i.e., lose the meaning of sharing the same information among multiple devices. However, even in this case, the second layer D1B is shared between the display devices 100A and 100B.

While the wording "shared display information D1" will continue to be used in the following description, the first layers D1A of the display devices 100A and 100B could be different from each other as described above.

Such a difference in the first layer D1A may cause the following situation. Specifically, when the display device 100A transmits the first layer D1A that includes additional content to the display device 100B and the display device 100B adopts the received first layer D1A, the additional content is displayed again on the display 30B.

To avoid such a situation, the "child" display device 100B may store the deleted additional content in its storage (e.g., storage 103). In this case, the information processing part 130B determines whether or not the received first layer D1A includes additional content that needs to be deleted. When it is determined that the first layer includes such additional content, the information processing part 130B of the display device 100B deletes the additional content from the received first layer D1A and updates its own shared display information D1. This suppresses unintended redisplay of the additional content that has been deleted after the elapse of a predetermined period of time.

Redisplay of Additional Content

The "child" display device 100B may again display deleted additional content in accordance with input by the user UB.

For example, the information processing part 130B of the "child" display device 100B may read out deleted additional content from its storage (e.g., storage 103) in accordance with input by the user UB, add the additional content to the first layer D1A, and update its own shared display information D1. This input is provided, for example, using the touch panel 50. In other words, the touch panel 50 receives redisplay input for again displaying the additional content.

In response to this redisplay input, the information processing part 130B arranges the deleted additional content at, for example, the pre-deletion location of the additional content in the first layer D1A. Then, the display controller 150B displays the latest shared display information D1 on the display 30B.

Figure 26:
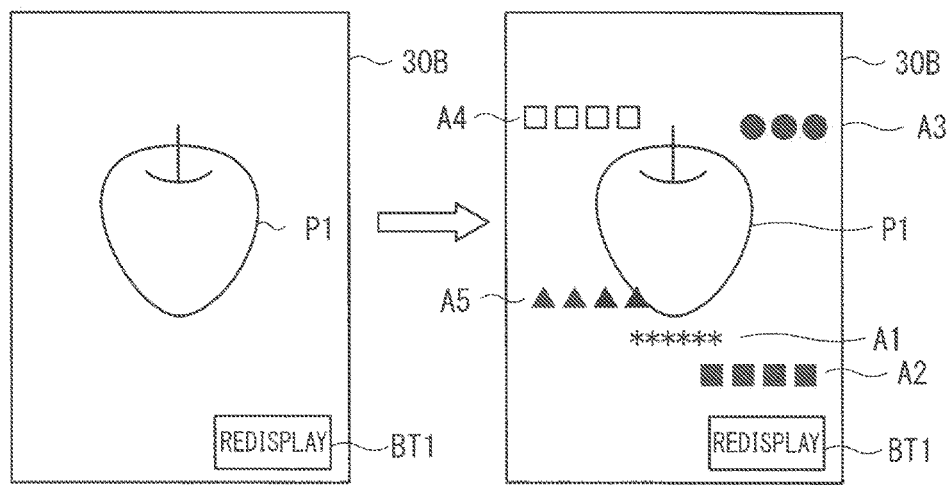
FIG. 26 schematically illustrates an example of the transition of display screens in a child display.

FIG. 26 schematically illustrates an example of a display screen of the display 30B. In the illustration of FIG. 26, a button BT1 is displayed on the display 30B. This button BT1 is for again displaying deleted additional content. In the illustration of FIG. 26, advice A1 to A5 is shown as additional content, and the display 30B on the left side displays the shared display information D1 with the advice A1 to A5 deleted.

When the user UB operates the button BT1, this operation is detected by the touch panel 50B and this information is input to the information processing part 130B. In response to this operation, the information processing part 130B reads out past additional content of the first layer D1A from its storage, again reflects the additional content in the first layer D1A, and updates its own shared display information D1. Then, the display controller 150B displays the latest shared display information D1 on the display 30B. As a result, the advice A1 to A5 added in the past is displayed again as illustrated in the display 30B on the right side in FIG. 26.

This enables the user UB to check afterwards the content (advice A1 to A5) added in the past by the user UA, thus improving user convenience.

Note that the information processing part 130B may add additional content at pre-deletion locations of the additional content, or may display additional content in a list in a predetermined region.

The information processing part 130B may again delete additional content that is displayed again from the shared display information D1 when the predetermined period of time T1 has elapsed after the display of the additional content.

When the "parent" display device 100A deletes additional content after elapse of the predetermined period of time T1, the "parent" display device 100A may also similarly store the additional content in its storage (e.g., storage 103) and again display the additional content according to input by the user UA.

In the example described above, the "child" display device 100B deletes the additional content added by the "parent" display device 100A on condition that the predetermined period of time T1 has elapsed. However, the "parent" display device 100B may also delete the additional content added by the "child" display device 100A on condition that the predetermined period of time T1 has elapsed. Alternatively, both of the above may be employed.

In the example described above, the information processing part 130B of the "child" display device 100B reflects additional content added by the "parent" display device 100A in the first layer D1A. Incidentally, information of the second layer D1B that reflects processing input by the user UB is not deleted even after elapse of the predetermined period of time T1. Thus, when the user does not want to delete additional content, the information processing part 130B may reflect additional content (additional content information) of the first layer D1A in the second layer D1B according to input by the user UB. This prevents the additional content from being deleted.

Such input may be provided by, for example, the user operating a dedicated button which the display controller 150 displays on the display 30B.

In the first to third embodiments, the shared display information D1 is described using the first layer D1A and the second layer D1B. Alternatively, the shared display information D1 may include three or more layers. While the above description uses the example of two display devices, three or more display devices may be adopted. In this case, for example, shared display information D1 that includes three layers corresponding to three display devices may be adopted. These three layers may be superimposed on one another to form a single piece of shared display information D1. In this case, three users are able to make changes to a single piece of shared display information D1. Alternatively, two of the three layers, namely, the first and second layers, may be arranged side by side in the same layer, and the remaining third layer may be arranged to cover these two layers. In this case, two screens that correspond respectively to the first and second layers are formed. The third layer is for writing on these two screens.

While the above has been a detailed description of display devices, the above description is illustrative in all aspects, and display devices of the present disclosure are not limited to the description given above. Numerous modifications and variations that are not illustrated are conceivable without departing from the scope of the present disclosure.

Embodiments of the present disclosure may be implemented in combination as long as there are no mutual inconsistencies.

The invention claimed is:

1. A display device configured to share display of a display object with an external device, the display device comprising:
   a display;
   an input device; and
   at least one processor configured to
      switch between a synchronous mode and an asynchronous mode, while in the synchronous mode and while the display object is shared with the external device, when an input for updating the display object is received via the input device, cause the display to update the display object according to the input, and send first information relevant to the updated display object to the external device,
      while in the asynchronous mode and while the display object is shared with the external device, when an input for updating the display object is received via the input device, cause the display to update the display object according to the input, but do not send the first information relevant to the updated display object to the external device,
      regardless of whether in the synchronous mode or the asynchronous mode, when second information relevant to the display object is received from the external device, cause the display to update the display object according to the second information, and
      cancel the update to the display object, which was performed according to the second information received from the external device, after a predetermined period of time has elapsed after the update,
      wherein the at least one processor is configured to increase the predetermined period of time every time the input device receives a predetermined input.

2. The display device according to claim 1, wherein the display object comprises one or more of a graphical image and text.

3. The display device according to claim 1, wherein the at least one processor is configured to, while in the asynchronous mode and while the display object is shared with the external device, when the second information is received within a predetermined period of time after receipt of the input, wait until the predetermined period of time lapses before updating the object according to the second information.

4. The display device according to claim 1, wherein the display object comprises a first layer, to be edited at the external device, and a second layer, to be edited at the display device, and wherein the at least one processor is configured to overlay the second layer above the first layer.

5. A processor for a display device configured to share display of an object with an external device, the display device comprising a display, and an input device, the processor configured to:
- switch between a synchronous mode and an asynchronous mode;
- while in the synchronous mode and while the object is shared with the external device, when an input for updating the object is received via the input device, cause the display to update the object according to the input, and send first information relevant to the updated object to the external device;
- while in the asynchronous mode and while the object is shared with the external device, when an input for updating the object is received via the input device, cause the display to update the object according to the input, but do not send the first information relevant to the updated display object to the external device;
- while in the asynchronous mode and while the display object is shared with the external device, when second information is received within a predetermined period of time after receipt of the input, determine whether or not the predetermined period of time has passed; and
- cause the display to update the display object according to the second information when determining that the predetermined period of time has passed.

6. The processor according to claim 5, wherein the processor is configured to, regardless of whether in the synchronous mode or the asynchronous mode, when second information relevant to the display object is received from the external device, cause the display to update the display object according to the second information.

7. A display device configured to share displaying an object with an external device, comprising:
- a display;
- an input device; and
- at least one processor configured to
   - switch between a synchronous mode and an asynchronous mode, while in the synchronous mode and while the object is shared with the external device, when an input for updating the object is received via the input device, cause the display to update the object according to the input, and send first information relevant to the updated object to the external device,
   - while in the asynchronous mode and while the object is shared with the external device, when an input for updating the object is received via the input device, cause the display to update the object according to the input, and send the first information with second information that prevents the external device from updating the object according to the first information,
   - regardless of whether in the synchronous mode or the asynchronous mode, when third information relevant to the object is received from the external device, cause the display to update the object according to the third information, and
   - cancel the update to the object, which was performed according to the third information received from the external device, after a predetermined period of time has elapsed after the update,
   - wherein the at least one processor is configured to increase the predetermined period of time every time the input device receives a predetermined input.

* * * * *